United States Patent [19]

Terada et al.

[11] Patent Number: 4,985,969
[45] Date of Patent: Jan. 22, 1991

[54] SLIDER FOR SLIDE FASTENERS

[75] Inventors: Yasuharu Terada, Uozu; Susumu Ishii, Kurobe, both of Japan

[73] Assignee: Yoshida Kogyo, K.K., Tokyo, Japan

[21] Appl. No.: 464,714

[22] Filed: Jan. 12, 1990

Related U.S. Application Data

[63] Continuation of Ser. No. 386,727, Jul. 31, 1989, abandoned.

[30] Foreign Application Priority Data

Aug. 2, 1988 [JP] Japan ................... 63-193985

[51] Int. Cl.⁵ .................................. A44B 19/26
[52] U.S. Cl. .......................... 24/429; 24/419
[58] Field of Search ............... 24/429, 419, 421, 420, 24/437, 236; 294/3.6; 70/68

[56] References Cited

U.S. PATENT DOCUMENTS

| | | |
|---|---|---|
| 2,495,539 | 1/1950 | Natzler et al. |
| 3,075,269 | 1/1963 | Simberg ................ 24/419 |
| 4,055,876 | 11/1977 | Ackermann et al. ........ 24/421 |
| 4,210,196 | 7/1980 | Weiner. |
| 4,389,758 | 6/1983 | Akashi .................... 24/429 |
| 4,395,891 | 8/1983 | Remington ................ 70/68 |
| 4,773,132 | 9/1988 | Eckels ................... 24/562 |
| 4,790,050 | 12/1988 | Ishii ..................... 24/429 |

FOREIGN PATENT DOCUMENTS

| | | |
|---|---|---|
| 0287060 | 10/1988 | European Pat. Off. |
| 2145453 | 2/1973 | France. |
| 2601565 | 1/1988 | France. |
| 57-113015 | 7/1982 | Japan. |
| 61-174407 | 10/1986 | Japan. |
| 62-102407 | 6/1987 | Japan. |
| 62-200915 | 12/1987 | Japan. |
| 1370005 | 10/1974 | United Kingdom. |
| 2026598 | 2/1980 | United Kingdom. |

Primary Examiner—Victor N. Sakran
Attorney, Agent, or Firm—Hill, Van Santen, Steadman & Simpson

[57] ABSTRACT

A slider pull tab for a slide fastener comprises a pull tab body formed from an elastic, flexible material and a first connector and a second connector, both connectors being formed as an integral unit from a metal or mechanically strong plastics material by simultaneous cast molding and either of said connectors having a pivotal pin about which the pull tab body can freely rotate. The pull tab body is cast-molded integrally with the second connector and has through apertures communicating with connecting bridges to ensure film bond of the surface layers of the pull tab body.

3 Claims, 5 Drawing Sheets

FIG. 1
FIG. 2
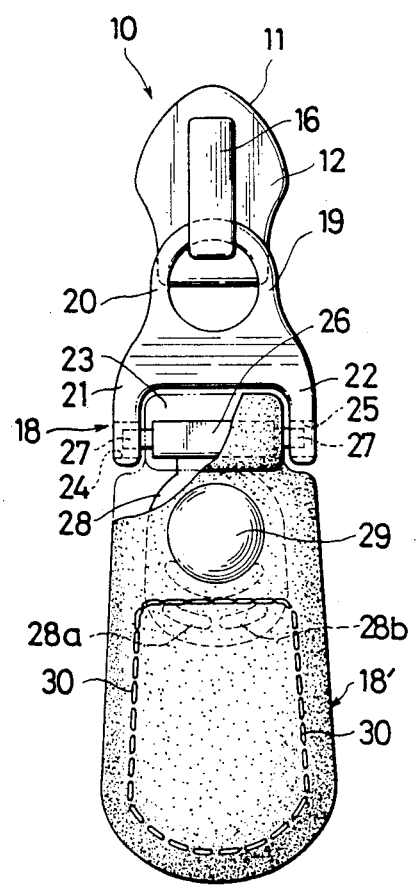
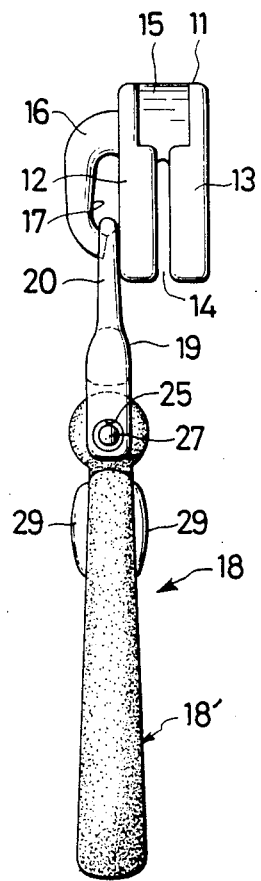

SLIDER FOR SLIDE FASTENERS

This is a continuation of application Ser. No. 386,727, filed July 31, 1989 now abandoned.

BACKGROUND OF THE INVENTION

1. Field of the Invention

This invention relates to sliders for slide fasteners, more particularly to a slider pull tab made of an elastic, flexible material such as synthetic rubber, synthetic leather or other elastic synthetic resinous materials.

2. Prior Art

There are known a variety of slide fastener sliders having different forms and designs of pull tabs which are tailored to meet with the particular specifications set up by the garment manufacturers who produce all sorts of garment articles ranging from clothing, sports wear, sports equipment to bags, etc. Technologies have been advanced to suit small lot production of sliders with many different types of pull tabs, one example of which is disclosed in Japanese Utility Model Laid-Open No. 62-200915 wherein there is provided a slider having a trunnion to which a pull tab connector is pivotally linked, the connector including bifurcated arms interconnected by a pin about which a pull tab is pivotally mounted. Since the pin is stationarily clamped at both ends to the arms, this would often restrict free pivotal motion of the pull tab when assembled and leave the pull tab lifted up above the plane of the slider as shown in FIG. 10 of the accompanying drawings, whereas the pull tab should desirably be dropped downwardly toward the article to which the slider is attached. When the pull tab thus is disposed in such erected position, it is prone to catch and impair what is there to come in contact with the pull tab, not to mention of its unsightly appearance.

With the prior art technology utilized to make a slider having a pull tab formed from an elastic material such as synthetic rubber, it would be necessary to provide an axial bore in the pull tab by injection-molding for insertion of a pivotal pin or, to form such a pin-receiving bore, in the case of synthetic leather, by folding back an end of a leather strip or by folding the same in halves and then sewing or otherwise bonding near the folds to produce the bore. Injection-molded pull tabs however have limited mechanical strength such that the resulting pin-receiving bore cannot be made large enough and would undergo deformation with time and with the way many of the pull tabs are stacked together. In the case of a pull tab made of artificial leather, the bore when formed by folding the tab is rather flattened, making it tedious, if not difficult, to thread the pin through the bore and to keep the pin freely rotative, not to mention of the case where the pin is clamped at both of its ends to the pull tab connector.

SUMMARY OF THE INVENTION

It is therefore the primary object of the present invention to provide a slider pull tab for a slide fastener which is formed by cast molding of an elastic, flexible material, into an integral structure including a pivotal pin and first and second connectors, without the necessity of an additional step of assembling these parts and wherein the pull tab is supported for free rotation.

A slider pull tab according to the invention comprises a pull tab body formed by cast molding from an elastic, flexible material and a first connector and a second connector, both of which connectors are formed as an integral unit from a metal or mechanically strong plastics material by simultaneous cast molding whereby either of the connectors is provided in situ with a pivotal pin about which the pull tab body can freely rotate.

The above and other objects and features of the invention will appear more apparent from the following detailed description taken in conjunction with the accompanying drawings in which like reference numerals refer to like or corresponding parts throughout the several views.

BRIEF DESCRIPTION OF THE DRAWINGS

FIG. 1 is a plan view of a slider embodying the invention;

FIG. 2 is a side elevational view of the same;

DETAILED DESCRIPTION

Figure 3:
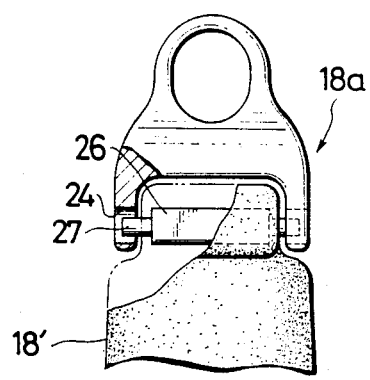
FIG. 3 is a partially sectional plan view of a portion of a slider pull tab according to one embodiment of the invention.

Referring now to the drawings and FIGS. 1 and 2 in particular, there is shown a slider 10 embodying the invention which is used to open and close a slide fastener. The slider 10 comprises a slider body 11 formed by an upper flange 12 and a lower flange 13 defining therebetween a guide channel 14 for the passage of a slide fastener not shown and connected together at one of its ends by a neck 15 (commonly known as a diamond), and an arch-shaped trunnion 16 having an aperture 17 for pivotally receiving a pull tab 18.

The pull tab 18 includes a first connector 19 provided at one end with a ring-like hook portion 20 pivotally engaged with the trunnion 16 of the slider body 11 and at the other end with bifurcated arms 21 and 22 defining therebetween a concave recess 23 and having respective aligned transverse bores 24 and 25, and a second connector 26 in the form of a cross-sectionally square or oblong bar extending within the recess 23 transversely between the bifurcated arms 21 and 22 and having an integral pivotal pin 27 at each of its opposite ends for pivotal engagement in the corresponding one of the bores 24, 25.

Both first and second connectors 19 and 26 are formed from a metal or mechanically strong plastics material. Preferably a reinforcing strip 28 is provided extending integrally centrally from the second connector 26 into a pull tab body 18' and has a plurality of through aperture 28a.

Designated at 29 is a grommet formed on opposite faces of the reinforcing strip 28 for ornamental purposes.

A stitch-like design 30 is likewise provided for ornamental purposes on the pull tab body 18'.

A pull tab 18a shown in FIG. 3 is substantially identical with the pull tab 18 in FIG. 1 except that it is devoid of the reinforcing strip 28, the grommet 29 and the stitch-like design 30.

Figure 4:
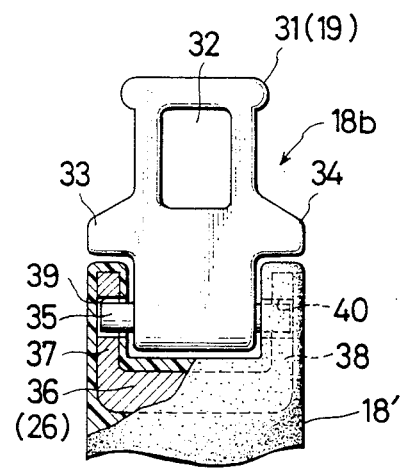
FIG. 4 is a partially sectional plan view of a portion of a slider pull tab according to another embodiment of the invention.

A pull tab 18b shown in FIG. 4 has a first connector 31 in the form of a generally rectangular black including a square opening 32 at one end, shoulders 33, 34 on opposite sides of the opening 32 and a transverse pivotal pin 35 at the other end. A second connector 36 in the pull tab 18b is substantially U-shaped with parallel arms 37 and 38 having respective bores 39 and 40 for pivotally receiving the transverse pin 35 of the first connector 31.

Figure 5:
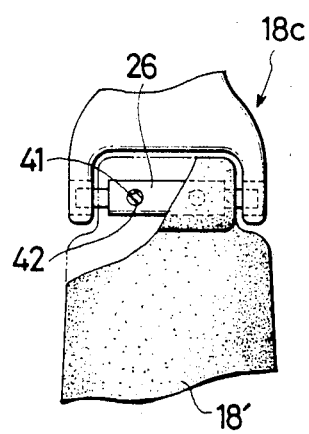
FIG. 5 is a partially sectional plan view of a portion of a slider pull tab according to a further embodiment of the invention.

A pull tab 18c shown in FIG. 5 is similar to the pull tab 18a in FIG. 3 but having through apertures 41 in the second connector 26 for purposes hereafter to be described.

Figure 6:
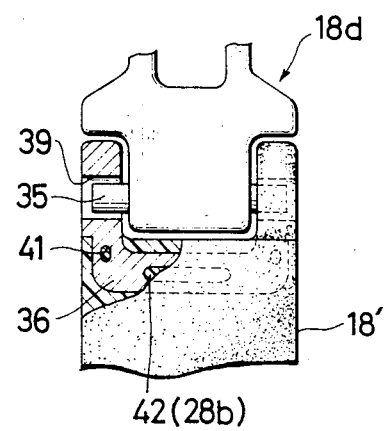
FIG. 6 is a partially sectional plan view of a portion of a slider pull tab according to still another embodiment of the invention.

A pull tab 18d shown in FIG. 6 is similar to the pull tab 18b in FIG. 4 but having through apertures 41 and a connecting bridge 42 in the second connector 36 for purposes hereafter to be described.

Figure 7:
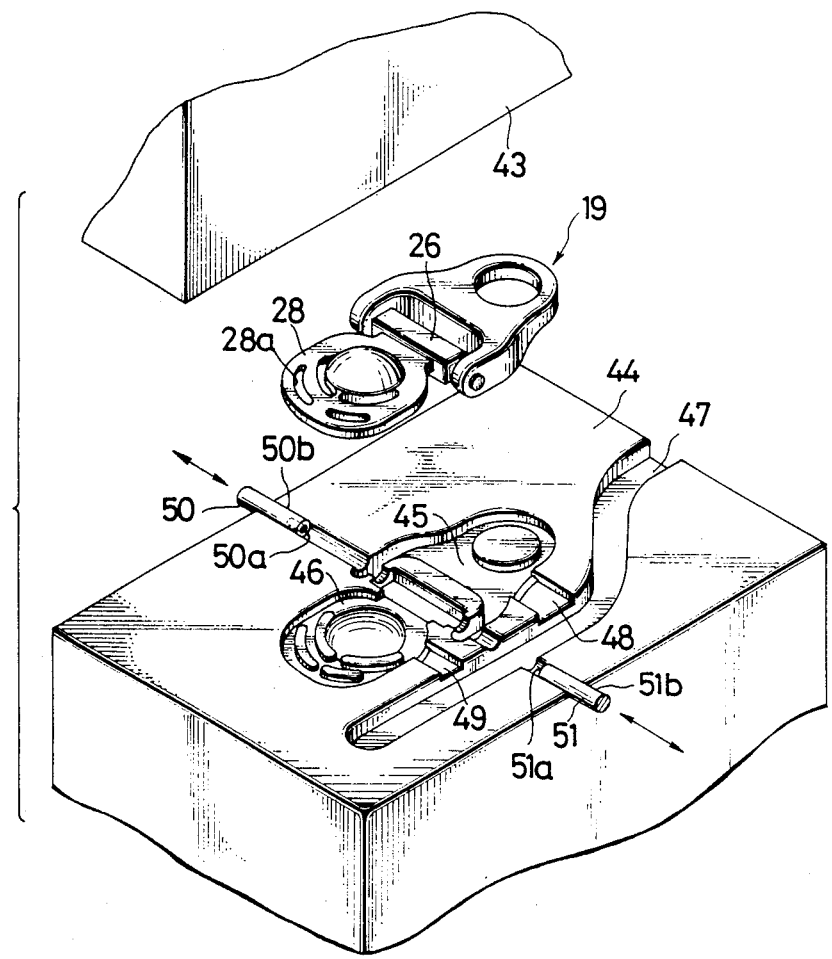
FIG. 7 is a perspective view showing a mold and a slider pull tab formed thereby.
Figure 9:
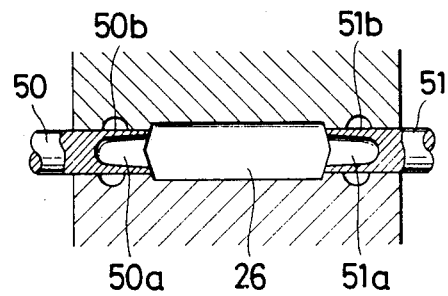
FIG. 9 is a cross-sectional view of a portion of a mold used in the invention.
Figure 10:
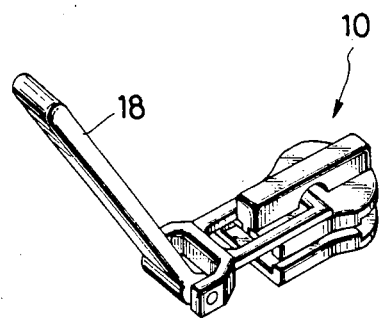
FIG. 10 is a perspective view of a prior art slider.

According to the invention, the first connector 19, (31) and the second connector 26, (36) are formed as an integral part by simultaneous cast molding which is casting if the part is a metal, or injection-molding if the part is a plastics material. FIGS. 7 and 9 show a molding device which is used to form the first and second connectors of the pull tab 18 shown in FIG. 1 simultaneously with the pivotal pin 27 pivotally inserted in the bores 24, 25. The device comprises a pair of identical vertically opposed molds 43 and 44, one of which is shown in FIG. 7 which includes molding cavities 45 and 46 configured to represent a replica of an integrally formed first and second connector assembly (19 and 26), a runner 47, gates 48 and 49 and a pair of transverse sliding cores 50 and 51. The cores 50 and 51 have respective cut-away apertures 50a and 51a into which a molten mold or cast material is introduced to form the pivotal pin 27 as inserted in the bores 24, 25 which are simultaneously formed by the respective peripheral surfaces 50b and 51b of the cores 50, 51. The pin 27 and its associated bores 24 and 25 are formed by inserting the cores 50 and 51 from opposite sides through the junction of the first connector 19 and the second connector 26 as shown in FIG. 7 and better in FIG. 9. The through apertures 28a in the reinforcing strip 28 serve to ensure firm adhesion thereof with the mold material subsequently applied to form the pull tab body 18'. Those apertures 28a closely adjacent to the grommet 29 serve in particular to prevent the resinous material from separating from around the margin of the grommet 29.

Figure 8:
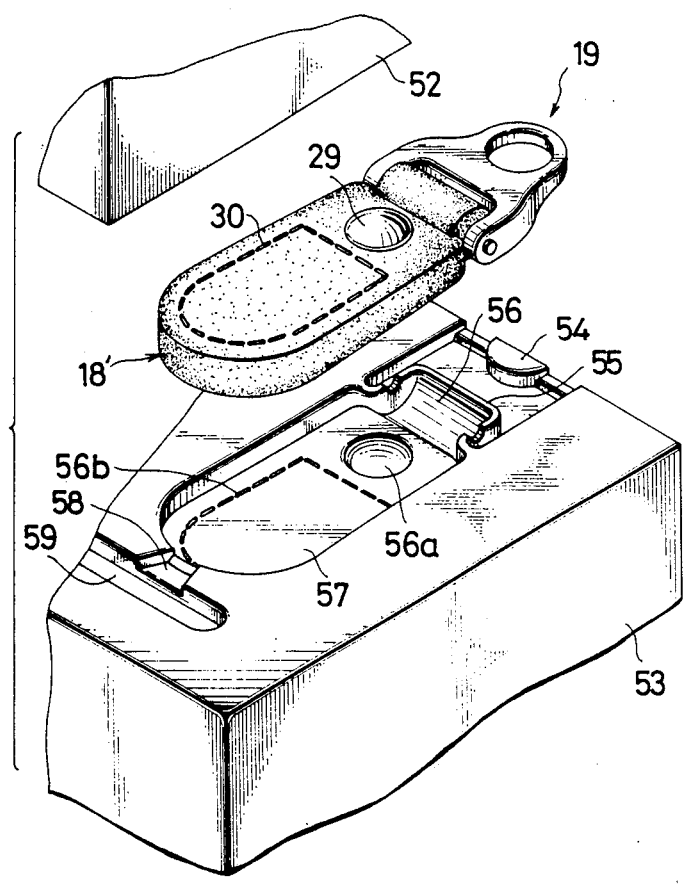
FIG. 8 is a perspective view showing another mold and a slider pull tab formed thereby.

FIG. 8 illustrates a pair of identical vertically opposed molds 52, 53 for forming the pull tab body 18' and then finishing the formation of a complete pull tab product to be assembled with a slider body. Each of the molds 52, 53 (the lower one being shown in FIG. 8) comprises connector support member 54 and 55 for supporting the first and second connectors 19 and 26 respectively, when molding the pull tab body 18' integrally therewith a first cavity 56 defined by the support member 55 for receiving a mold material in the recess 23 to adhesively cover the second connector 26, and a second cavity 57 contiguous to the first cavity 56 for receiving the material to form the pull tab body 18' including the reinforcing strip 28, the second cavity 56 having sub-cavities 26a and 56b for shaping the grommet 29 and the stitch design 30 respectively. Designated at 58 and 59 are a gate and a runner respectively.

The connector assembly 19 and 26 is supported in place on the support members 54, 55, followed by casting a molten mold material into the cavities 56, 57 thereby forming a pull tab body 18' integrally connected to the second connector 26 as shown in FIG. 8. The through apertures 28a in the second connector 36 (FIG. 6) communicating with apertures 28a or in the reinforcing strip 28 (FIG. 1) adjacent to the grommet 29 form connecting bridges 28b which firmly bond the upper and lower halves together of the pull tab body 18'.

What is claimed is:

1. A slider pull tab for a slide fastener formed by cast molding into an integral structure which comprises a first connector, a second connector, a pull tab body integrally connected to said second connector and a pivotal pin which is formed integrally with either of said first and second connectors and about which said pull tab body is freely rotatable, said first and second connectors being formed by simultaneous cast molding, and said pull tab body being cast-molded from an elastic, flexible material.

2. A slider pull tab according to claim 1 wherein said second connector has an integral reinforcing strip which is integrally bonded to said pull tab body by cast molding.

3. A slider pull tab according to claim 1 wherein said second connector has a plurality of through apertures and said pull tab body 18' has connecting bridges communicating with said apertures.

* * * * *